(12) United States Patent
Yamashita et al.

(10) Patent No.: US 11,062,151 B2
(45) Date of Patent: Jul. 13, 2021

(54) METHOD FOR ASCERTAINING A DESCRIPTION OF A LANE

(71) Applicant: Bayerische Motoren Werke Aktiengesellschaft, Munich (DE)

(72) Inventors: Yusaku Yamashita, Kanagawa (JP); Georg Tanzmeister, Munich (DE); Marc Hofmann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 106 days.

(21) Appl. No.: 15/816,807

(22) Filed: Nov. 17, 2017

(65) Prior Publication Data

US 2018/0089518 A1    Mar. 29, 2018

Related U.S. Application Data

(63) Continuation of application No. PCT/EP2016/060502, filed on May 11, 2016.

(30) Foreign Application Priority Data

May 20, 2015   (DE) .................... 10 2015 209 186.4

(51) Int. Cl.
*G06K 9/00*   (2006.01)
*B60W 30/12*   (2020.01)
*G08G 1/16*   (2006.01)

(52) U.S. Cl.
CPC ......... *G06K 9/00798* (2013.01); *B60W 30/12* (2013.01); *G06K 9/00805* (2013.01);
(Continued)

(58) Field of Classification Search
CPC .......... G06K 9/00798; G06K 9/00805; G08G 1/167; B60W 30/12; B60W 2550/14; G06T 2207/30256
See application file for complete search history.

(56) References Cited

U.S. PATENT DOCUMENTS

| 8,948,954 B1 | 2/2015 | Ferguson et al. |
| 2008/0136612 A1* | 6/2008 | Machii ................. G01S 17/931 340/435 |

(Continued)

FOREIGN PATENT DOCUMENTS

DE    10 2006 062 061 A1    7/2008

OTHER PUBLICATIONS

PCT/EP2016/060502, International Search Report dated Jul. 13, 2016 (Five (5) pages).

(Continued)

*Primary Examiner* — Sean M Conner
(74) *Attorney, Agent, or Firm* — Crowell & Moring LLP

(57) ABSTRACT

A method for ascertaining a description of a lane which is in an environment of a vehicle includes ascertaining an assignment function that is set up to assign different values of a feature vector different descriptions of a lane. The method also includes ascertaining environment data of the vehicle, where the environment data includes information about a roadway marking and/or about one or more objects in the environment of the vehicle. In addition, the method includes ascertaining a current value of the feature vector on the basis of the environment data, and determining a description of the lane using the assignment function and using the current value of the feature vector.

1 Claim, 2 Drawing Sheets

(52) U.S. Cl.
CPC ......... *G08G 1/167* (2013.01); *B60W 2552/00* (2020.02); *G06T 2207/30256* (2013.01)

(56) References Cited

U.S. PATENT DOCUMENTS

| | | |
|---|---|---|
| 2009/0295922 A1 | 12/2009 | Mori |
| 2009/0319113 A1 | 12/2009 | Lee |
| 2011/0087433 A1* | 4/2011 | Yester .................... G01C 21/32 701/301 |
| 2013/0039588 A1* | 2/2013 | Li .......................... G06T 1/0028 382/201 |
| 2015/0325127 A1* | 11/2015 | Pandita .................... G08G 1/16 701/431 |
| 2017/0053533 A1* | 2/2017 | Kuroda .................... G06T 7/60 |

OTHER PUBLICATIONS

German Search Report issued in German counterpart application No. 10 2015 209 186.4 dated Apr. 22, 2016, with Statement of Relevancy (Ten (10) pages).

Pazhayampallil et al., "Deep Learning Lane Detection for Autonomous Vehicle Localization", Dec. 13, 2013, pp. 1-5, XP055285582, Stanford University, CA, USA, URL:http://cs229.stanford.edu/proj2013/PazhayampallilKuan-DeepLearningLaneDetectionAutonomousVehicleLocation.pdf.

Bundesministerium Der Justiz Ed—Bundesministerium Der Justiz, "Handbuch der Rechtsfoermlichkeit", Jan. 1, 2008, 24 total pages, XP002686041, URL:http://hdr.bmi.de/page_b.1.html.

Mohamed Aly, "Real time detection of lane markers in urban streets", Intelligent Vehicles Symposium, 2008 IEEE, IEEE, Piscataway, NJ, USA, Jun. 4, 2008, 6 total pages, XP031318797.

Hong Cheng et al., "Springrobot: A Prototype Autonomous Vehicle and Its Algorithms for Lane Detection", IEEE Transactions on Intelligent Transportation Systems, IEEE, Piscataway, NJ, USA, vol. 5, No. 4, Dec. 1, 2004, pp. 300-308, XP011122966.

Chenyi Chen et al., "DeepDriving: Learning Affordance for Direct Perception in Autonomous Driving", 2015 IEEE International Conference on Computer Vision (ICCV), IEEE, Dec. 7, 2015, 9 total pages, XP032866617.

Georg Tanzmeister et al., "Grid-Based Multi-Road-Course Estimation Using Motion Planning", IEEE Transactions on Vehicular Technology, IEEE Service Center, Piscataway, NJ, US, vol. 65, No. 4, Apr. 1, 2016, pp. 1924-1935, XP011606355.

* cited by examiner

METHOD FOR ASCERTAINING A DESCRIPTION OF A LANE

CROSS REFERENCE TO RELATED APPLICATIONS

This application is a continuation of PCT International Application No. PCT/EP2016/060502, filed May 11, 2016, which claims priority under 35 U.S.C. § 119 from German Patent Application No. 10 2015 209 186.4, filed May 20, 2015, the entire disclosures of which are herein expressly incorporated by reference.

BACKGROUND AND SUMMARY OF THE INVENTION

The invention relates to a method and a corresponding control unit for ascertaining digital map information, such as e.g. the profile of a lane for a vehicle.

Highly automated driving requires up-to-date digital maps having a high level of accuracy. A digital map typically comprises road models that represent single roads or roadways in a road network. The model of a road displays e.g. the number of lanes on a road, the width of the lanes, the profile of the lanes, etc. An autonomously driving vehicle can use a digital map (and particularly the road models of a digital map) to move in a network of roads. In particular, an autonomously driving vehicle can take the digital map as a basis for moving in a particular lane on a particular road or roadway.

Digital maps are typically produced by a map provider and provided in a vehicle. Moreover, the digital maps are updated by the provider in a dedicated process and made available as an update at particular intervals of time (e.g. every three months). Such an update process results in digital maps typically not being sufficiently up to date and accurate for use in an autonomously driving vehicle.

The present disclosure is concerned with the technical object of providing up-to-date and precise information about a roadway to be used by a vehicle or about a lane to be used by a vehicle efficiently and at any time.

According to one aspect, a method for ascertaining a description of a lane which is in an environment of a vehicle is described. The lane may be the lane in which the vehicle is currently traveling. Alternatively or additionally, it is also possible to ascertain descriptions of one or more adjacent lanes. The description of the lane can comprise particularly information concerning the profile of the lane and/or concerning the width of the lane. By way of example, the description can display a multiplicity of points on the lane in the direction of travel in front of the vehicle.

The method comprises ascertaining an assignment function that is set up to assign different values of a feature vector different descriptions of a lane. The assignment function may have been trained on the basis of training data as part of a machine learning method. Therefore the assignment function can assign the value of a feature vector a description of a lane, which description has a high level (possibly a maximum level) of statistical relevance to the value of the feature vector in consideration of the training data.

In this case, the feature vector can comprise a multiplicity of features, wherein the multiplicity of features describes one or more properties of a roadway marking and/or of one or more objects in the environment of the vehicle (particularly in the environment in the direction of travel in front of the vehicle). The one or more properties can comprise a position $y_{FB}$ of the roadway marking, an orientation, particularly a heading angle $\varphi_{FB}$, at the roadway marking and/or a curvature feature $\theta_{FB}$ of the roadway marking. Alternatively or additionally, the one or more properties can comprise a position $y_n$ of an object, a speed of movement of the object and/or a direction of movement of the object. Therefore, the feature vector can provide a compact and representative description of the environment of the vehicle. To this end, the feature vector can comprise a limited number of dimensions, i.e. a limited number of features (e.g. 40, 30 or fewer features).

The method comprises ascertaining environment data of the vehicle, wherein the environment data display information about the roadway marking and/or about the one or more objects in the environment of the vehicle. The environment data can comprise particularly camera data, radar data, LIDAR data and/or ultrasonic data from applicable ambient sensors of the vehicle. The environment data can be taken as a basis for ascertaining a current value of the feature vector. In particular, current values can be ascertained for a multiplicity of features of the feature vector. From these, the current value of the feature vector is then obtained.

The one or more objects in the environment of the vehicle can comprise particularly one or more other vehicles and/or one or more other road users on the roadway used by the vehicle. Alternatively or additionally, the one or more objects in the environment of the vehicle can comprise one or more verge developments on the roadway, such as e.g. one or more guardrails, one or more pylons, one or more bars, etc.

The method additionally comprises determining a description of the lane using the assignment function and using the current value of the feature vector. In particular, one or more descriptions of the lane can be ascertained that are assigned to the current value of the feature vector by the assignment function. From the one or more descriptions, it is then possible (e.g. by averaging) to determine a description of the lane.

The description of the environment of a vehicle using a feature vector and by using a (trained) assignment function allows an up-to-date and precise description of a lane to be provided in an efficient manner. This can be effected in an analogous manner for a roadway having a multiplicity of lanes. The method can be carried out in an autonomous manner in this case by the control unit of a vehicle, and therefore allows the vehicle to ascertain current digital map information that can then be used e.g. for an autonomous driving function of the vehicle.

The method can be used to determine a description or a model of an ego lane of the vehicle and/or of one or more adjacent lanes of the vehicle. In particular, the method can be used to determine a description or a model for a roadway having a multiplicity of lanes.

The assignment function can comprise particularly a neural network having a multiplicity of neurons. In this case, a neuron is set up to assign a representative value of the feature vector an applicable description of the lane. Alternatively or additionally, the assignment function can comprise a multiplicity of clusters having an applicable multiplicity of cluster representatives. In this case, the cluster representative of a cluster has the same dimension as the feature vector. Moreover, each of the multiplicity of clusters has a (different) assigned description of the lane in this case. The use of neural networks and/or the use of cluster algorithms allows a precise assignment function to be trained in an efficient manner using training data. Training can be effected in an advance training process, and the trained assignment function can subsequently be provided on a memory unit of the vehicle. This then allows the vehicle precise and up-to-date ascertainment of lane descriptions.

The determining of a description of the lane can comprise ascertaining a measure of distance between the current value of the feature vector and the representative values of the multiplicity of neurons. It is then possible for the one or more neurons for which a relatively low measure of distance is obtained to be selected. The one or more descriptions of the lane are obtained from the lane descriptions that are assigned to the one or more selected neurons. These one or more descriptions can be averaged if need be in order to determine the description of the lane that is provided by the method.

Alternatively or additionally, the determining of a description of the lane can comprise ascertaining a measure of distance between the current value of the feature vector and the multiplicity of cluster representatives. It is then possible to select the one or more clusters for which a relatively low measure of distance is obtained. The one or more descriptions of the lane are then obtained from the lane descriptions that are assigned to the one or more selected clusters. These one or more descriptions can be averaged if need be in order to determine the description of the lane that is provided by the method.

The measure of distance can comprise a (possibly weighted and/or possibly quadratic) Euclidean distance. One or more of the weights of the measure of distance may be dependent on the number N of objects for which the feature vector has a feature. In particular, the one or more weights can increase as the number N of objects increases. This can apply particularly for weights that describe a property of the roadway marking. It is thus possible to ensure that the influence of the properties of a roadway marking is maintained even when the number N of objects is rising. It is therefore possible to ensure a constantly high level of accuracy for the ascertained description of a lane.

The ascertaining of a current value of the feature vector can comprise detecting, on the basis of the environment data, a multiplicity of objects in the environment of the vehicle. Moreover, the distances of the multiplicity of objects from the vehicle can be ascertained (particularly the distances in the direction of travel). The multiplicity of objects can then be ordered on the basis of the distances, and if need be a subset of the multiplicity of objects can be selected in order to ascertain the current value of the feature vector. In particular, the objects can be included in the feature vector as the distance increases, and/or only the N objects at the shortest distance can be included in the feature vector. The ordering and/or selecting of the objects according to distance can ensure that the feature vector provides a concise and reliable description of the environment of the vehicle. This in turn results in increased precision for the ascertained description of the lane.

The ascertaining of an assignment function can comprise ascertaining a number N of objects for which at least one feature is supposed to be included in the feature vector. In this case, the number N may be dependent on how many objects can be detected in the environment of the vehicle (e.g. up to a particular limit distance from the vehicle). Therefore, the number N and hence the dimension of the feature vector can vary. The assignment function can thus be ascertained or selected on the basis of the number N. By way of example, a multiplicity of assignment functions can be provided for different N on a memory unit of the vehicle. It is then possible to select an assignment function for the current number N. It is thus possible to ensure that a precise description of the lane can be determined even for different environment situations.

The method can further comprise ascertaining M assignment functions, wherein an m-th assignment function of the M assignment functions, wherein m=1, . . . , M, is set up to assign different values of a feature vector different descriptions of a roadway having m lanes. It is therefore possible to provide assignment functions that allow descriptions to be determined for a different number m of lanes.

It is then possible to use the M assignment functions and to use the current value of the feature vector to determine an optimum assignment function from the M assignment functions, wherein the optimum assignment function maximizes a measure of confidence. To this end, the M assignment functions can be used to determine M descriptions of roadways having m=1, . . . , M lanes, e.g. for the current value of the feature vector. Moreover, M measures of distance can be ascertained to give representative values of neurons or cluster representatives from which the M descriptions are obtained. The M measures of distance can then display the confidence of the applicable M assignment functions. In particular, the optimum assignment function can have the smallest measure of distance at the M measures of distance.

It is then possible to take the optimum assignment function as a basis for determining the number of lanes on a roadway used by the vehicle. In particular, it is possible to determine that the roadway has m lanes if the optimum assignment function corresponds to the m-th assignment function. The method therefore allows further information (the number m of lanes) about the currently used roadway to be provided in an efficient and precise manner.

According to a further aspect, a method for ascertaining an assignment function is described, which assignment function is set up to assign different values of a feature vector different descriptions of a lane in an environment of a vehicle. In this case, the feature vector comprises a multiplicity of features, wherein the multiplicity of features describes one or more properties of a roadway marking and/or of one or more objects in the environment of the vehicle.

The method comprises ascertaining training data having a multiplicity of value pairs, wherein a value pair comprises an actual value of a feature vector and an applicable actual description of a lane or of a roadway having a multiplicity of lanes. Additionally, the method comprises training the assignment function using the training data. It is thus possible to provide, in an efficient manner, an assignment function that allows a vehicle to ascertain an up-to-date and precise description of a lane or of a roadway having a multiplicity of lanes.

According to a further aspect, a control unit is described that is set up to carry out one or more of the methods described in this document.

According to a further aspect, a vehicle (particularly a road vehicle, e.g. an automobile, a truck or a motor cycle) is described that comprises the control unit described in this document.

According to a further aspect, a software (SW) program is described. The SW program can be set up to be executed on a processor (e.g. on a control unit of a vehicle) and thereby to carry out the method described in this document.

According to a further aspect, a storage medium is described. The storage medium can comprise an SW program that is set up to be executed on a processor and thereby to carry out the method described in this document.

It should be noted that the methods, apparatuses and systems described in this document can be used either alone or in combination with other methods, apparatuses and systems described in this document. Moreover, any aspects of the methods, apparatuses and systems described in this document can be combined with one another in a wide variety of ways. In particular, the features of the claims can be combined with one another in a wide variety of ways.

Other objects, advantages and novel features of the present invention will become apparent from the following detailed description of one or more preferred embodiments when considered in conjunction with the accompanying drawings.

BRIEF DESCRIPTION OF THE DRAWINGS

The invention is described in more detail below using exemplary embodiments. For these.

DETAILED DESCRIPTION OF THE DRAWINGS

As set out at the outset, the present document is concerned with the efficient ascertainment of up-to-date and precise information about a road network. In particular, a vehicle is supposed to be provided with up-to-date and precise information about the profile of a roadway or about the profile of a lane of a currently used roadway at any time. The vehicle can then use this information to drive autonomously or with a high level of automation.

Figure 1:
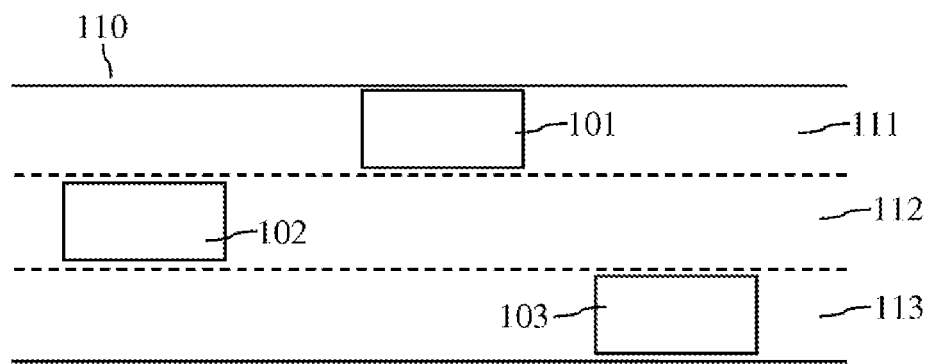
FIG. 1 shows an exemplary roadway with an ego vehicle and a multiplicity of objects in the environment of the ego vehicle.

FIG. 1 shows an exemplary roadway 110 having three lanes 111, 112, 113. Moreover, FIG. 1 shows a vehicle 102 that travels in the second lane 112. This vehicle 102 is subsequently referred to by way of example as an ego vehicle, and the second lane 112 as an ego lane. Additionally, FIG. 1 shows a multiplicity of vehicles 101, 103 in the surroundings of the ego vehicle 102. These vehicles 101, 103 are examples of objects in the environment of the ego vehicle 102.

Figure 2:
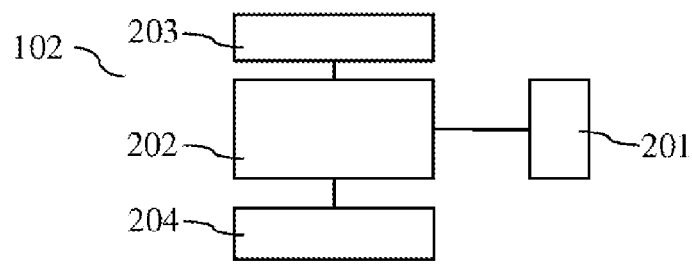
FIG. 2 shows exemplary components of a vehicle.

FIG. 2 shows exemplary components of the ego vehicle 102. The ego vehicle 102 comprises one or more ambient sensors 201 that are set up to capture environment data concerning the environment of the ego vehicle 102 (particularly concerning the environment in the direction of travel in front of the ego vehicle 102). The ambient sensors 201 can comprise one or more cameras, one or more radar sensors, one or more LIDAR sensors, etc. Additionally, the ego vehicle 102 comprises a control unit 202 that is set up to evaluate the environment data and to take the environment data as a basis for detecting one or more objects 101, 103 in the environment of the ego vehicle 102. Moreover, information about the position and the movement of the one or more objects 101, 103 can be ascertained. In particular, a speed and/or a direction of movement of an object 101, 103 can be ascertained. The information concerning the one or more objects 101, 103 can be ascertained relative to the ego vehicle 102.

The control unit 202 is further set up to actuate one or more actuators 203 of the ego vehicle 102 in order to control the ego vehicle 102 in the longitudinal direction and/or the transverse direction. In particular, the control unit 202 may be set up to guide the ego vehicle 102 in the longitudinal and/or transverse direction in an autonomous manner, i.e. without intervention by a driver of the ego vehicle 102. By way of example, the ego vehicle 102 can be guided automatically in the ego lane 112. For this purpose, the environment data can be evaluated. In particular, the environment data can be taken as a basis e.g. for ascertaining the profile of roadway markings of the ego lane 112.

Moreover, the control unit 202 may be set up to access digital map information that is stored on a memory unit 204 of the vehicle 102. The digital map information can display e.g. the number of lanes 111, 112, 113 and the profile of the lanes 111, 112, 113 of the currently used roadway 110. The control unit 202 can also use this information to guide the ego vehicle 102 over the current roadway 110 autonomously in a longitudinal and/or transverse direction.

The digital map information is typically provided by a map provider and updated at relatively long intervals of time. It is therefore not possible to ensure that the digital map information is correct at a particular time. In particular, the profile of the lanes 111, 112, 113 could have altered on account of roadworks. The presence of incorrect digital map information can lead to termination of the autonomous driving function.

The control unit 202 may therefore be set up to access an assignment function that allows the control unit 202 to take the environment data as a basis for ascertaining a description of a lane 111, 112, 113 in the environment of the ego vehicle 102. The assignment function may be stored in the memory unit 204 of the ego vehicle 102. The description of a lane 111, 112, 113 can comprise e.g.:
  a profile, particularly one that is in front of the ego vehicle 102, of the lane 111, 112, 113. The profile can be described e.g. by a multiplicity of points, the points being at a predefined distance (e.g. 5 meters) from one another. It is thus possible e.g. for the profile of the lane 111, 112, 113 to be described over a particular range (e.g. 50 meters) ahead;
  a width of the lane 111, 112, 113; and/or
  an interruption, particularly one which is in front of the ego vehicle 102, in the lane 111, 112, 113.

The assignment function can assign different feature vectors to different (predefined) descriptions of roadways 110 or lanes 111, 112, 113. In this case, a feature vector can describe states in the environment of a vehicle 102. To describe the state in the environment of a vehicle 102, a feature vector can comprise a multiplicity of features as dimensions of the feature vector. These features can in this case be selected such that they can be ascertained in an efficient manner on the basis of environment data from one or more ambient sensors 201 on a vehicle 102. Moreover, the features can be selected such that they are as independent of one another as possible and that they have a highest possible degree of relevance in relation to the description to be ascertained for a roadway 110 or a lane 111, 112, 113.

The following features, in particular, have been found to be advantageous for the ascertainment of the (future) profile of a roadway 110 or of a lane 112. These features can be grouped into roadway information, into object information and into verge information. The manifestations or values of the different features can be indicated relative to an ego vehicle 102. In particular, a distance can be indicated relative to a position of the ego vehicle 102. Moreover, a heading angle can be indicated relative to a direction of travel of the ego vehicle 102.

The roadway information can be ascertained on the basis of roadway markings. In particular, the lateral distance $y_{FB}$ of a roadway marking of a currently used lane 112 to an ego vehicle 102 in this lane 112 can be ascertained. Moreover, a heading angle $\varphi_{FB}$ of the roadway marking and/or a curvature $\theta_{FB}$ of the roadway marking and/or a change of curvature $\dot{\theta}_{FB}$ of the roadway marking can be ascertained. The roadway information can be ascertained e.g. on the basis of environment data that display the roadway 110 in front of an ego vehicle 102.

The object information can be ascertained for one or more (possibly for all) of the objects 101, 103 detected in the environment of an ego vehicle 102. In particular, a lateral distance $y_n$ of an n-th object 101 of n=1, . . . , N objects 101, 103 from an ego vehicle 102 can be ascertained. Moreover, information concerning a movement of the n-th object 101 (particularly a direction of movement, e.g. a heading angle, and/or a speed of movement) can be ascertained. By way of example, the position of the n-th object 101 can be ascertained at two successive times. From the difference in the positions, it is then possible to ascertain a distance delta dx in the direction of travel of the ego vehicle 102 and a distance delta dy perpendicular to the direction of travel of the ego vehicle 102. The distance delta $(dx_n, dy_n)$ then indicates both the direction of movement and the speed of movement of the n-the object 101 (relative to the ego vehicle 102). The object information can be ascertained on the basis of environment data that display the one or more objects 101, 103 in the environment of the ego vehicle 102.

The verge information can display information in relation to verge developments, such as e.g. bushes, trees, houses, etc. In particular, a position of verge developments relative to the position of the ego vehicle 102 can be indicated. The verge information can also be ascertained on the basis of environment data.

The verge information comprises objects, such as e.g. bushes, trees, houses, etc., that are typically not arranged on a lane 111, 112, 113 of a roadway 110. These objects can likewise be regarded as objects in the environment of the ego vehicle 102, however. The objects described in this document in the environment of the ego vehicle 102 can therefore comprise object information (particularly in relation to an object on a lane 111, 112, 113 on a roadway 110) and/or verge information (particularly in relation to an object outside the lanes 111, 112, 113 on a roadway 110).

A feature vector can comprise one or more of the aforementioned features as a dimension. An exemplary feature vector x comprises e.g. roadway information for a currently used lane 112 of an ego vehicle 102 and object information for N objects 101, 103 in a current environment of the ego vehicle 102, i.e.

$$x=(y_{FB},\varphi_{FB},\theta_{FB},y_1,dx_1,dy_1, \ldots ,y_N,dx_N,dy_N).$$

The different features can be included in predefined dimensions of the feature vector (as displayed in the formula above). This is significant particularly for the different objects, since otherwise a single environment situation could result in different values of feature vectors. The features of the different objects can be included in the feature vector e.g. on the basis of a longitudinal distance $x_n$ of the n=1, . . . , N objects 101 in the direction of travel of the ego vehicle 102. By way of example, the object at the shortest longitudinal distance $x_n$ can be included in the feature vector first, etc. as the longitudinal distance $x_n$ increases. The longitudinal distance $x_n$ can also be used to select a limited number of N objects 101 for the feature vector from a larger set of detected objects 101. The distance-dependent selection and inclusion of object features in the feature vector can ensure that like environment situations result in like values of the feature vector.

The features of the feature vector x can assume a multiplicity of different values or manifestations in a particular value range. The control unit 202 of an ego vehicle 102 may be set up to ascertain current values of the features, and hence a current value of a feature vector x, on the basis of current environment data.

The assignment function is set up to assign the current value of a features vector x a model or a description y of a roadway 110 or of a lane 112 of the roadway 110. The description y of a roadway 110 or of a lane 112 can comprise the aforementioned information. By way of example, the description y of a lane 112 can comprise a multiplicity of points that describe the profile ahead for the lane 112.

As already set out, the control unit 202 of the ego vehicle 102 may be set up to take the current environment data as a basis for ascertaining a current value of a feature vector that describes the current environment of the ego vehicle 102. Moreover, the control unit 202 may be set up to use the ascertained current value of the feature vector and use the assignment function to ascertain a description of the currently used roadway 110 and/or the currently used lane 112. It is therefore possible in an efficient manner to ascertain up-to-date and precise digital map information concerning the currently used roadway 110. The control unit 202 can use this information (particularly the description of the currently used roadway 110) to guide the ego vehicle 102 in an autonomous manner.

The assignment function y=f(x) can be determined in an advance training phase by means of an algorithm for machine learning. To this end, the training data having a multiplicity of value pairs can be provided, wherein a value pair comprises an actual value of a feature vector and an applicable actual description of a roadway 110. The training data can be ascertained using ambient sensors 201 of vehicles 202.

The training data can be used to train the assignment function. An example of an assignment function is a neuron network that comprises a multiplicity of neurons (e.g. a self-organizing and incremental neural network). The training data can be used to ascertain a multiplicity of neurons, wherein a neuron is set up to assign a value of a feature vector an applicable description of the roadway 110.

Alternatively or additionally, the assignment function can comprise a multiplicity of clusters having an applicable multiplicity of cluster representatives. The training data can be combined by means of a cluster algorithm to form clusters, and a cluster representative can be ascertained for each cluster (e.g. as a mean value of the actual values of the feature vectors in the cluster). Moreover, a description of the roadway 110 can be ascertained for each cluster (e.g. as a mean value of the actual descriptions of the roadway 110 in the cluster). The cluster representatives can then be used to assign a current value of a feature vector to a cluster (using a particular measure of distance). The cluster can then display the applicable current description of the roadway 110.

If need be, separate assignment functions can be ascertained for determining the description of the lane 112 currently used by the ego vehicle 102 (i.e. the ego lane) and for determining the description of the adjacent lanes 111, 113. To this end, the training data can be split into first training data with value pairs of the feature vectors and the applicable description of the ego lane, and into second training data with value pairs of the feature vectors and the applicable description of all the lanes 111, 112, 113. The first training data can then be used to ascertain a first assignment function that can determine the description of the ego lane 112, and the second training data can then be used to ascertain a second assignment function that can determine the description of all the lanes 111, 112, 113 of a roadway 110. It is thus possible to achieve the effect that the description of the ego lane 112 can be ascertained with a particularly high level of accuracy. This is advantageous because the ego lane 112 is particularly significant for autonomous driving of the ego vehicle 102.

The number N of detected objects 101 in the (forward) environment of the ego vehicle 102 can vary. Moreover, the number M of lanes 111, 112, 113 of a roadway 110 can vary. In order to allow precise ascertainment of the description of a roadway 110 or of a lane 112, it may be advantageous to ascertain assignment functions for different situations, the different situations being able to differ in terms of the number N of objects 101 in the feature vector; and/or
the number M of lanes 111, 112, 113 on the roadway 110 to be described.

By way of example, assignment functions can be ascertained for N=1, . . . , 20 and/or for M=1, . . . , 5 lanes 111, 112, 113. Therefore, N×M (e.g. 100) assignment functions are obtained that can be ascertained and stored on the memory unit 204 of an ego vehicle 102.

The control unit 202 may be set up to take current environment data as a basis for determining the current number N of (relevant) objects 101. It is then possible to select the M assignment functions for situations with the current number N of (relevant) objects 101 (e.g. M=5 assignment functions for m=1, . . . , M lanes 111, 112, 113).

The control unit 202 may further be set up to take the current environment data as a basis for determining a current value of the feature vector (for N objects 101). The current value of the feature vector and the M assignment functions can then be used to ascertain a description for the roadway 110 (on the assumptions that the roadway 110 comprises m=1, . . . , M lanes 111, 112, 113). Moreover, a measure of confidence can be ascertained for the different assumptions. The measure of confidence can be ascertained e.g. on the basis of the distance of the current value of the feature vector from the different neurons or cluster representatives of the M assignment functions. The measure of confidence can then be used to determine which of the M different assumptions is correct, i.e. it is possible to ascertain how many lanes the roadway 110 actually has.

The distance between the value of a feature vector and a neuron or a cluster representative can be determined by means of a measure of distance, wherein the measure of distance comprises e.g. a Euclidean distance, particularly a quadratic Euclidean distance. In this case, it is possible for normalization or weighting of the different dimensions of the feature vector to be effected if need be. The measure of distance D(p,q), where p is a manifestation of the feature vector and q is a representative value of a neuron or a cluster representative, can be provided e.g. by the following formula $$D(p,q)=(p \times q)^T W(p-q).$$

Here, W is a diagonal weighting matrix that is dependent on the number N of objects 101 that are taken into consideration in the feature vector. W can weight the features of the roadway information with $$\alpha = \frac{R_O N + 1}{R_{FB}},$$

where $R_{FB}$ corresponds to the number of features from the roadway information and $R_O$ corresponds to the number of features per object 101. On the other hand, the features of the objects 101 may be weighted with "1". Therefore, the measure of distance can be made independent of the number N of objects 101 in the feature vector. In particular, it is thus possible to standardize the precision of the ascertainment of the description of a roadway 110.

During operation of the ego vehicle 102, the control unit 202 can use the current environment data to ascertain a current value of a feature vector and at least one assignment function. It is thus possible to ascertain a particular number K of descriptions of the roadway 110. By way of example, the K neurons of the assignment function that are closest to the current value of the feature vector can be ascertained. From the K neurons, K descriptions of the roadway 110 are then obtained. The predicted description of the roadway 110 can then be ascertained on the basis of the K descriptions (e.g. as a mean value of the K descriptions).

Figure 3:
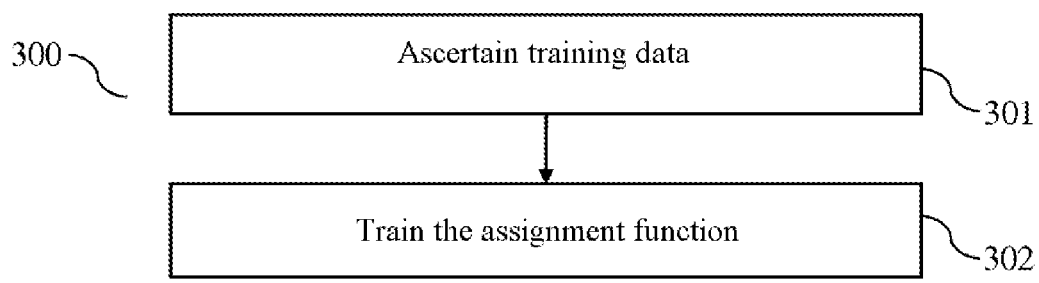
FIG. 3 shows a flowchart for an exemplary method for ascertaining an assignment function for ascertaining a description of a lane.

FIG. 3 shows a flowchart for an exemplary method 300 for ascertaining an assignment function that is set up to assign different values of a feature vector different descriptions of a lane 112 in an environment of a vehicle 102. The feature vector comprises a multiplicity of features. In this case, the multiplicity of features can describe particularly one or more properties of a roadway marking and/or of one or more objects 101, 103 in the environment of the vehicle 102.

The method 300 comprises ascertaining 301 training data having a multiplicity of value pairs, wherein a value pair comprises an actual value of a feature vector and an applicable actual description of a lane 112. Moreover, the method comprises training 302 the assignment function using the training data. In particular, it is thus possible to train a neural network and/or a cluster function.

Figure 4:
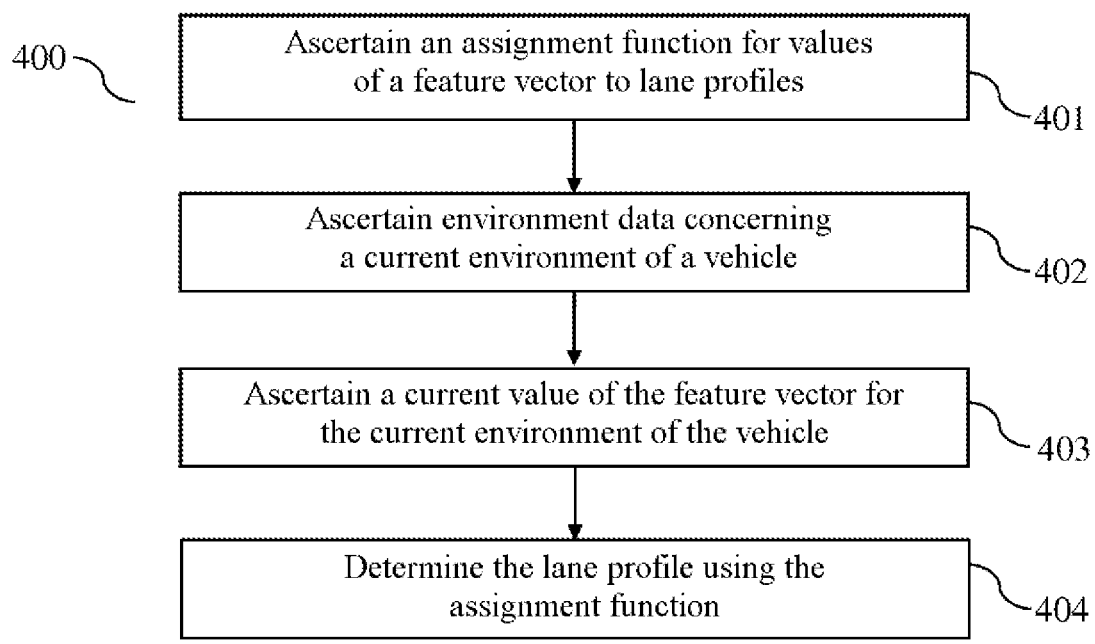
FIG. 4 shows a flowchart for an exemplary method for ascertaining a description of a lane.

FIG. 4 shows a flowchart for an exemplary method 400 for ascertaining a description of a lane 112, which is in an environment of a vehicle 102. The method 400 comprises ascertaining 401 an assignment function that is set up to assign different values of a feature vector different descriptions of a lane 112. The assignment function can be obtained e.g. from a memory unit 204 of the vehicle 102. The method 400 further comprises ascertaining 402 environment data of the vehicle 112, wherein the environment data display information about a roadway marking and/or about one or more objects 101, 103 in the environment of the vehicle 102. Additionally, the method 400 comprises ascertaining 403 a current value of the feature vector on the basis of the environment data. The method 400 further comprises determining 404 a description of the lane 112 using the assignment function and using the current value of the feature vector.

The present invention is not restricted to the exemplary embodiments shown. In particular, it should be noted that the description and the figures are supposed to illustrate only the principle of the proposed methods, apparatuses and systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for ascertaining a description of a lane which is in an environment of a vehicle, wherein the method comprises the acts of:

ascertaining an assignment function that is set up to assign different values of a feature vector different descriptions of a lane, wherein the feature vector comprises a multiplicity of features;

ascertaining environment data of the vehicle, wherein the environment data includes information about at least one of a roadway marking and one or more objects in the environment of the vehicle;

ascertaining a current value of the feature vector on the basis of the environment data;

wherein ascertaining the current value of the feature vector further comprises:

detecting a multiplicity of objects in the environment of the vehicle on the basis of the environment data;

ascertaining distances of the multiplicity of objects from the vehicle; and including the multiplicity of objects in the feature vector in a distance-dependent order based on the ascertained distances of each respective one of the multiplicity of objects; and determining a description of the lane using the assignment function and using the current value of the feature vector;

wherein the assignment function comprises at least one of:

a neural network having a multiplicity of neurons, wherein a neuron is set up to assign a representative value of the feature vector an applicable description of the lane; and a multiplicity of clusters having an applicable multiplicity of cluster representatives, wherein the cluster representative of a cluster has an identical dimension to the feature vector, and wherein each of the multiplicity of clusters has an assigned description of the lane;

wherein determining the description of the lane comprises at least one of:

ascertaining a measure of distance between the current value of the feature vector and the representative values of the multiplicity of neurons; and ascertaining a measure of distance between the current value of the feature vector and the multiplicity of cluster representatives;

wherein the measure of distance comprises a quadratic Euclidean distance; and one or more weights of the measure of distance is dependent on a number N of objects for which the feature vector has a feature.

* * * * *